UNITED STATES PATENT OFFICE 2,367,629

ADHESIVES

Jan Teppema, Cambridge, and Joseph F. Manning, Boston, Mass., assignors to B. B. Chemical Co., Boston, Mass., a corporation of Massachusetts No Drawing. Application July 2, 1943,
Serial No. 493,299

3 Claims. (Cl. 260—23)

This invention relates to liquid adhesive compositions embodying butadiene-acrylonitrile copolymer and more particularly to such adhesives advantageous for securing together leather and shoe parts.

Butadiene-acrylonitrile copolymer may be obtained commercially in the form known as "Hycar" (Type O. R.) manufactured by the Hycar Chemical Company, Akron, Ohio. The material "Hycar" is plastic in the sense that it may be worked on the rolls of a rubber mill and compounded with other ingredients in a manner similar to that in which crude rubber is treated. Such copolymer of butadiene-acrylonitrile may be "cured" or "vulcanized" to a condition in which it is elastic rather than plastic and in which condition it resembles vulcanized rubber. This "curing" is probably a further polymerization of the plastic copolymer to a substantially fully polymerized condition rather than the addition of sulphur to the polymer such as is considered to occur in the vulcanization of rubber. The commercial copolymers contain approximately 75% by weight of butadiene and 25% of acrylonitrile. Similar copolymers may also be obtained commercially under the trade name "Chemigum" manufactured by Goodyear Tire & Rubber Co., Akron, Ohio, or under the trade name "Perbunan" manufactured by the Standard Oil Company of New Jersey.

From their general similarity to neoprene a synthetic rubber-like material it might be supposed that such butadiene-acrylonitrile copolymers would be suitable as an adhesive medium, for example in the attachment of outsoles to shoe uppers in the manufacture of shoes. Such, however, is not the case. When the butadiene-acrylonitrile copolymer is employed for the attachment of an outsole to a shoe upper, the resulting adhesive bond is unsatisfactory. The adhesive bond is soft and stretchy, and the parts are not held closely together.

Objects of the present invention are to provide an improved liquid adhesive embodying butadiene-acrylonitrile copolymer and possessing advantageous characteristics for securing together parts of leather, especially shoe parts, and which will hold such parts in tight relation.

According to the present invention the above and other objects are attained by liquid adhesive compositions comprising butadiene-acrylonitrile copolymer in association with a toughener therefor, said toughener being of the group consisting of certain copolymers of vinyl chloride and vinyl acetate wherein the vinyl chloride predominates. The butadiene-acrylonitrile copolymer and vinyl polymer are dispersed in a solvent. In the composition the ratio by weight of the vinyl polymer and butadiene-acrylonitrile copolymer may range from 1:2 to 2:1, and a preferred ratio is 1:1. The composition may and preferably does contain compounding and modifying ingredients, and, in order to promote curing of the butadiene-acrylonitrile copolymer at temperatures in the neighborhood of room temperature, an accelerator may be associated with the composition.

The advantages of the invention are particularly apparent when adhesive compositions in accordance therewith are employed in the attaching of outsoles to shoe uppers. Compositions according to the invention provide an adhesive bond which is strong and wherein the shoe parts are held tightly together without gapping.

A specific example of a preferred composition in accordance with this invention is as follows:

| | Parts by weight |
|---|---|
| Butadiene-acrylonitrile copolymer ("Hycar," Type O. R.) | 100 |
| VYHF resin (copolymer of vinyl chloride and vinyl acetate) | 100 |
| Sulphur | 2 |
| Stearic acid | 1.5 |
| Zinc oxide | 5 |
| Calcium silicate (Silene) | 20 |
| Butyl eight (accelerator) | 0.25 |
| Methyl ethyl ketone | 800 |

The above composition may be prepared by milling the butadiene-acrylonitrile copolymer for a period of about 15 to 20 minutes. The sulphur, zinc oxide, calcium silicate and stearic acid then may be associated with the butadiene-acrylonitrile copolymer on the mill, and the milling may be continued for 10 or more minutes longer. The compounded material may then be cut into small pieces and placed in a churn with the solvent, and the churning continued for a substantial period of time, for example eight hours. The vinyl resin and "butyl eight" may be added to the material in the churn.

In the above composition the butadiene-acrylonitrile copolymer is the primary adhesive material and the vinyl resin is a toughener therefor. VYHF resin is a copolymer of about 88% vinyl chloride and 12% vinyl acetate, and is marketed by Carbide & Carbon Chemicals Corporation, New York, N. Y. The stearic acid aids in processing the butadiene-acrylonitrile copolymer. The sulphur and zinc oxide assist in the curing of the butadiene-acrylonitrile copolymer. Silene (calcium silicate) is a filler and reinforcer. "Butyl eight" is an accelerator of vulcanization and methyl ethyl ketone is a solvent. The solvent is preferably employed in such amount that the total of butadiene-acrylonitrile copolymer and vinyl resin will be from 20 to 25% by weight of the total composition.

Examples of other tougheners suitable for the purpose of this invention are VYNW resin containing about 95% vinyl chloride and 5% vinyl acetate, and VYNS resin containing about 90% vinyl chloride and 10% vinyl acetate. These resins are both marketed by Carbide & Carbon Chemicals Corporation.

In carrying out the adhesion of leather or shoe parts by means of liquid adhesive composition of this invention the parts, for example an outsole and shoe upper, are mechanically prepared for sole attaching preferably by roughing the attaching surfaces thereof in a suitable manner, such as by an emery wheel or a wire brush, in order to provide surfaces most advantageous for cementing. The liquid adhesive composition containing the butadiene-acrylonitrile copolymer and toughener is then applied preferably to both surfaces to be united. The application of the adhesive may be by brush, by extrusion or in any other suitable manner. The applied liquid adhesive composition is then permitted partially to dry whereby copolymer-toughener films are deposited on the respective attaching surfaces and anchored securely to the substance of the outsole and upper respectively.

While the copolymer-toughener is in adhesive condition, which may be within about 10 or 15 minutes after the application of the liquid adhesive composition to the outsole and shoe upper, the outsole and shoe upper are pressed together with the attaching surfaces in juxtaposition. The outsole and shoe upper may be maintained under sole attaching pressure for about 15 to 60 seconds. An attaching pressure of 80 pounds per square inch has been found satisfactory.

It will be seen that by this invention we have provided adhesive compositions embodying butadiene-acrylonitrile copolymer which may be satisfactorily employed to secure parts together in tight relation and to maintain them in such relation even when the parts are subjected to repeated and varied stresses.

Having described our invention, what we claim as new and desire to secure by Letters Patent of the United States is:

1. A liquid adhesive composition comprising butadiene-acrylonitrile copolymer containing in the neighborhood of 25% by weight of acrylonitrile, and a toughener for the butadiene-acrylonitrile copolymer consisting of a copolymer of vinyl chloride and vinyl acetate in which the vinyl chloride constituent predominates and the vinyl acetate constituent is more than 5%, said toughener and butadiene-acrylonitrile copolymer being present in the ratio by weight of from 1:2 to 2:1, the mixture of the two copolymers being dissolved in a volatile solvent.

2. A liquid adhesive composition comprising butadiene-acrylonitrile copolymer containing in the neighborhood of 25% by weight of acrylonitrile, and a toughener for the butadiene-acrylonitrile copolymer consisting of a copolymer of vinyl chloride and vinyl acetate in which the vinyl chloride constituent predominates and the vinyl acetate constituent is from about 10% to about 12%, said toughener and butadiene-acrylonitrile copolymer being present in the ratio by weight of from 1:2 to 2:1, the mixture of the two copolymers being dissolved in a volatile solvent.

3. A liquid adhesive composition for securing together parts of leather or other material, said composition comprising the following constituents in approximately the following proportions by weight:

| | Parts |
|---|---|
| Butadiene-acrylonitrile copolymer containing in the neighborhood of 25% by weight of acrylonitrile | 100 |
| Copolymer of vinyl chloride and vinyl acetate in which the vinyl acetate constituent is from about 10% to about 12% | 100 |
| Stearic acid | 1.5 |
| Zinc oxide | 5 |
| Sulphur | 2 |
| Calcium silicate | 20 |
| Solvent | 600 to 800 |

JAN TEPPEMA.
JOSEPH F. MANNING.